United States Patent
Weaver

(10) Patent No.: US 11,548,166 B2
(45) Date of Patent: Jan. 10, 2023

(54) COLLABORATIVE TASK EXECUTION WITH HUMANS AND ROBOTIC VEHICLES

(71) Applicant: Skylla Technologies, Inc., Lexington, MA (US)

(72) Inventor: Kota Weaver, Allston, MA (US)

(73) Assignee: Skylla Technologies, Inc., Lexington, MA (US)

( * ) Notice: Subject to any disclaimer, the term of this patent is extended or adjusted under 35 U.S.C. 154(b) by 203 days.

(21) Appl. No.: 16/296,188

(22) Filed: Mar. 7, 2019

(65) Prior Publication Data

US 2020/0189120 A1 Jun. 18, 2020

Related U.S. Application Data

(60) Provisional application No. 62/639,995, filed on Mar. 7, 2018.

(51) Int. Cl.
*B25J 13/08* (2006.01)
*B25J 9/16* (2006.01)
*B25J 5/00* (2006.01)
*G05D 1/02* (2020.01)

(52) U.S. Cl.
CPC ............ *B25J 13/085* (2013.01); *B25J 5/007* (2013.01); *B25J 9/1676* (2013.01); *G05D 1/0246* (2013.01); *G05D 2201/0216* (2013.01)

(58) Field of Classification Search
CPC ............ G05D 3/12; G05D 2201/0216; B60W 2300/40; B60W 60/001
See application file for complete search history.

(56) References Cited

U.S. PATENT DOCUMENTS

| | | | |
|---|---|---|---|
| 6,343,665 B1* | 2/2002 | Eberlein | B62B 3/1492 180/11 |
| 9,785,149 B2* | 10/2017 | Wang | G16H 40/67 |
| 2010/0078903 A1* | 4/2010 | Bravo | B62B 5/0056 280/33.992 |
| 2015/0139756 A1* | 5/2015 | Yamamoto | B25J 11/009 414/4 |
| 2016/0259339 A1* | 9/2016 | High | G06Q 50/30 |

(Continued)

OTHER PUBLICATIONS

IDH LIRMM "Human-robot collaborative carrying" YouTube Jul. 19, 2017, https://www.youtube.com/watch?v=IHG4AbAvt_4 (Year: 2017).*

*Primary Examiner* — Jeff A Burke
*Assistant Examiner* — Jerrod Irvin Davis
(74) *Attorney, Agent, or Firm* — Spano Law Group; Joseph S. Spano

(57) ABSTRACT

Methods and systems for joint execution of complex tasks by a human and a robotic system are described herein. In one aspect, a collaborative robotic system includes a payload platform having a loading surface configured to carry a payload shared with a human collaborator. The collaborative robotic system navigates a crowded environment, while sharing a payload with the human collaborator. In another aspect, the collaborative robotic system measures forces in a plane parallel to the loading surface of the payload platform to infer navigational cues from the human collaborator. In some instances, the collaborative robotic system overrides the navigational cues of the human collaborator to avoid collisions between an object in the environment and any of the robotic system, the human collaborator, and the shared payload.

20 Claims, 6 Drawing Sheets

(56) References Cited

U.S. PATENT DOCUMENTS

| | | | |
|---|---|---|---|
| 2017/0293294 A1* | 10/2017 | Atchley | ............... B66F 9/187 |
| 2017/0361462 A1* | 12/2017 | Chelian | ............... B25J 13/006 |
| 2018/0001485 A1* | 1/2018 | Yokoya | ............... B25J 13/085 |
| 2018/0354539 A1* | 12/2018 | Casey | ............... B62B 5/0033 |
| 2018/0370553 A1* | 12/2018 | Jones | ............... B62B 3/1496 |

* cited by examiner

COLLABORATIVE TASK EXECUTION WITH HUMANS AND ROBOTIC VEHICLES

CROSS REFERENCE TO RELATED APPLICATIONS

The present application for patent claims priority under 35 U.S.C. § 119 from U.S. provisional patent application Ser. No. 62/639,995, entitled "Collaborative Carrying With Humans And Robotic Vehicles," filed Mar. 7, 2018, the subject matter of which is incorporated herein by reference in its entirety.

TECHNICAL FIELD

The described embodiments relate to systems and methods for payload transport in a service environment.

BACKGROUND INFORMATION

Robotic systems are widely deployed to perform highly repetitive tasks, typically in a well-controlled, factory environment. In some examples of factory automation, a robot performs a single task repeatedly for long periods of time (e.g., months or years). However, the robotic systems are not yet widely deployed to perform tasks that are part of the everyday lives of humans. To better integrate robotic systems into the everyday lives of humans as well as custom workflows, robotic systems must be able to adapt to new tasks and environmental conditions.

In some examples, robotic systems have been developed with increased intelligence to enable robotic systems to perform a wide range of tasks in unstructured environments. Intelligent robotic systems are able to better comprehend complex tasks and execute the task at hand with less instruction. In addition, improved user interfaces enhance communication between humans and a robotic system; enabling the collaborative robotic system to better understand the task at hand. Recent improvements to user interfaces include the use of natural user interfaces and the use of speech and gesture based technologies to improve usability of robots. However, these approaches focus on communicating task goals and constraints to the collaborative robotic system for execution solely by the robotic system. This limits the complexity of the task that can be accomplished by the robotic system due to limitations in the physical and intellectual capability of the robotic system and limitations in the ability to communicate task parameters and constraints to the robotic system.

In summary, improvements to robotic systems are desired to enable execution of complex tasks in highly unstructured environments.

SUMMARY

Methods and systems for collaboration between humans and robotic systems to jointly execute complex tasks are described herein. Collaborative task execution takes advantage of the adaptability of humans and enables more effective use of a collaborative robotic system that would otherwise be limited to the execution of less complex tasks.

In one aspect, a collaborative robotic system includes a payload platform having a loading surface configured to carry a payload shared with a human collaborator.

In another aspect, load sensors of a collaborative robotic system measure forces in a plane parallel to the loading surface of the payload platform. The collaborative robotic system infers navigational cues from a human collaborator based on the measured forces.

In another aspect, a collaborative robotic system includes one or more proximity sensors configured to estimate the proximity of objects to the robotic system.

In another aspect, a collaborative robotic system navigates a crowded environment, while sharing a payload with a human collaborator. In some instances, the collaborative robotic system overrides the navigational cues of the human collaborator to avoid collisions between an object in the environment and any of the robotic system, the human collaborator, and the shared payload.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for collaboration between humans and robotic systems to jointly execute complex tasks are described herein. Collaborative task execution takes advantage of the adaptability of humans and enables more effective use of a collaborative robotic system that would otherwise be limited to the execution of less complex tasks.

Figure 1:
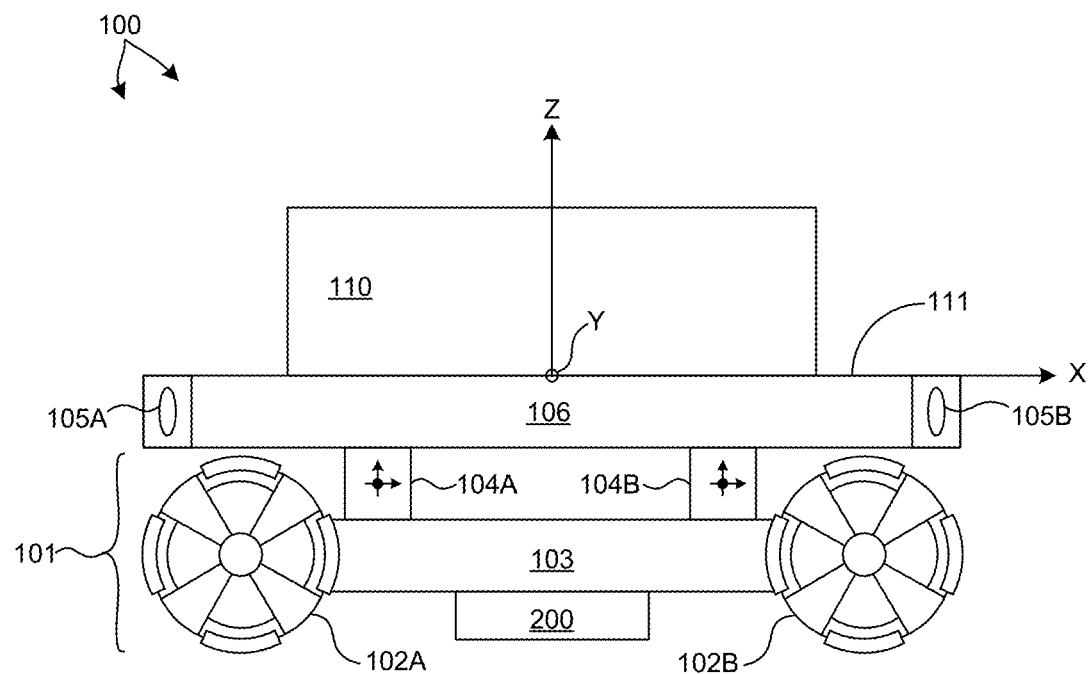
FIG. 1 is a diagram illustrative of an embodiment of a collaborative robotic system 100 including a wheeled, robotic vehicle and payload platform in side view.
Figure 2:
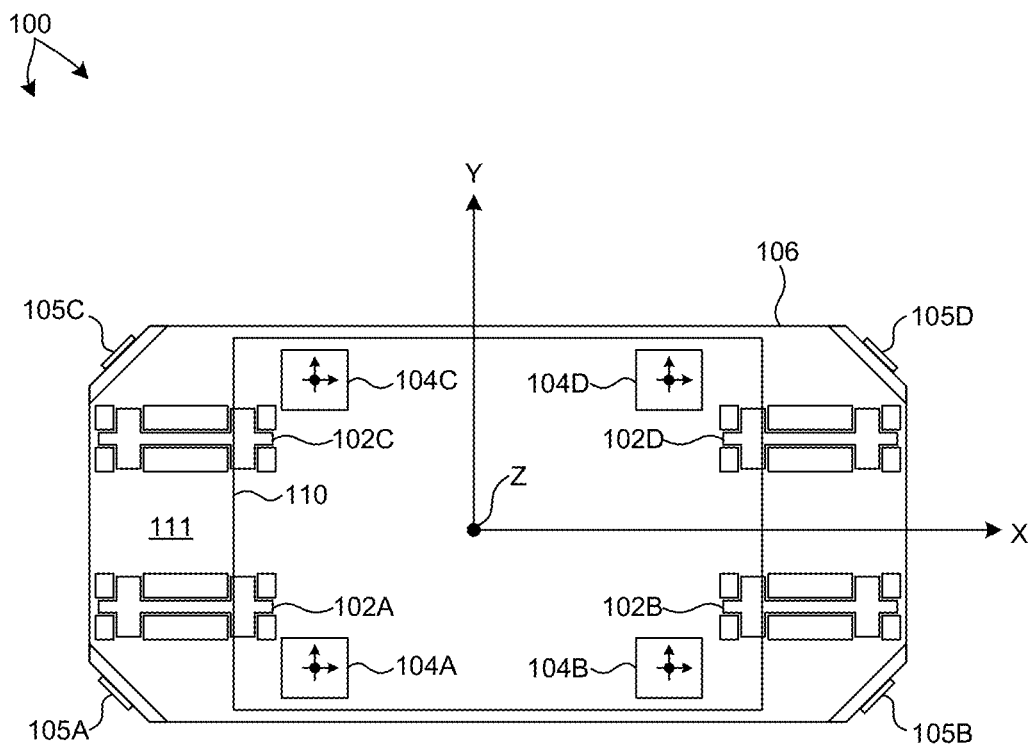
FIG. 2 is a diagram illustrative of an embodiment of a collaborative robotic system 100 including a wheeled, robotic vehicle and payload platform in top view.

FIGS. 1 and 2 depict a side view and a top view of collaborative robotic system 100, respectively, in one embodiment. Collaborative robotic system 100 includes a wheeled, robotic vehicle 101 with one or more actuated wheels (e.g., actuated wheels 102A-D) attached to a frame 103 of the vehicle 101. In some embodiments, wheeled, robotic vehicle 101 is an omni-directional robotic vehicle capable of translating in any direction in the xy plane and rotating about any axis parallel to the z-axis. In some of these embodiments, wheeled, robotic vehicle 101 is also holonomic, and thus is capable of independently translating in the xy plane and rotating about any axis parallel to the z-axis. In some embodiments, the one or more actuated wheels include a mecanum wheel, an omni-directional wheel, or any combination thereof. In one embodiment, wheeled, robotic vehicle 101 employs four mecanum wheels in direct drive. Computing system 200 communicates control commands to the actuated wheels of the wheeled, robotic vehicle that cause the wheeled, robotic vehicle to move in a desired direction in the xy plane and rotate about a desired axis parallel to the z-axis.

In one aspect, a collaborative robotic system includes a payload platform having a loading surface configured to carry a payload shared with a human collaborator. As depicted in FIGS. 1 and 2, collaborative robotic system 100 also includes a payload platform 106 configured to carry a payload 110.

In some embodiments, collaborative robotic system 100 includes one or more payload platform actuators (not shown) attached to the frame and the payload platform. The payload platform actuators are configured to move the payload platform in a direction normal to the load carrying surface 111 of the payload platform 106. In this manner, collaborative robotic system 100 is able to adjust a height of the payload platform 106 to meet the requirements of a variety of transportation tasks.

As depicted in FIG. 1, collaborative robotic system 100 includes load sensors (e.g., load sensors 104A-D). In the embodiment depicted in FIG. 1, load sensors 104A-D are coupled to payload platform 106 and frame 103. In general, load sensors 104A-D may be located in any suitable location in a load path between payload platform 106 and the actuated wheels (e.g., actuated wheels 102A-D). The load sensors are employed to analyze the distribution of load on the payload platform.

In another aspect, load sensors of collaborative robotic system 100 measure forces in a plane parallel to the loading surface of the payload platform. In the embodiment depicted in FIGS. 1 and 2, load sensors 104A-D measure forces in a plane parallel to the xy plane. Signals generated by load sensors 104A-D are communicated to computing system 200 for further processing.

In another aspect, collaborative robotic system includes one or more proximity sensors configured to estimate the proximity of objects to the robotic system. In general, collaborative robotic system 100 may proximity sensors of any suitable type. By way of non-limiting example, collaborative robotic system 100 may include proximity sensors such as capacitive sensors, Doppler effect sensors, Eddy-current sensors, inductive sensors, magnetic sensors, optical sensors, photoelectric sensors, photocell sensors, laser rangefinder sensors, passive sensors (e.g., charge-coupled devices), passive thermal infrared sensors, Radar sensors, sensors based on reflection of ionizing radiation, Sonar based sensors, ultrasonic sensors, fiber optic sensors, Hall effect sensors, or any combination thereof. In some embodiments, proximity sensors include three dimensional sensors (e.g., three dimensional LIDAR sensors, stereoscopic cameras, time-of-flight cameras, monocular depth cameras, etc.) located along the perimeter of robotic system 100 (e.g., along the front, sides, back, of robotic system 100, or any combination thereof). In some embodiments, RGB color information is employed in conjunction with depth data to estimate the proximity of objects relative to robotic system 100.

Proximity sensors of collaborative robotic system 100 may be coupled to the wheeled, robotic vehicle 101 in any suitable manner. In some examples, the proximity sensors are coupled to frame 103. In the embodiment depicted in FIGS. 1 and 2, the proximity sensors 104A-D are coupled to the payload platform 106. Signals generated by proximity sensors 105A-D are communicated to computing system 200 for further processing.

In some embodiments, collaborative robotic system 100 includes one or more image capture devices (e.g., charge coupled device (CCD) camera, complementary metal on silicon (CMOS) camera, etc.) also configured to estimate the proximity of objects to the robotic system. Signals generated by the image capture devices are communicated to computing system 200 for further processing.

FIG. 2 depicts a top view of the wheeled, robotic vehicle 101 and payload platform 106 of collaborative robotic system 100. As depicted in FIG. 2, wheeled robotic vehicle 101 includes actuated drive wheels 102A-D. The relative angular velocity of each of the actuated drive wheels 102A-D controls both the direction of the motion trajectory and the velocity along the motion trajectory of the wheeled, robotic vehicle 101. Signals generated by computing system 200 are communicated to actuated drive wheels 102A-D that causes the actuated drive wheels to move wheeled, robotic vehicle 101 along a desired motion trajectory at a desired velocity.

In some other embodiments, one or more wheels of wheeled robotic vehicle 101 are passive wheels that are free to rotate about multiple axes. In these embodiments, passive wheels function primarily to support the load normal to the ground surface, while the rotations of actuated drive wheels dictate the motion trajectory of the wheeled, robotic vehicle 101. In some other embodiments, the orientation of one or more passive wheels about an axis normal to the ground surface is actively controlled. In these embodiments, these steering wheels also function to control the direction of the motion trajectory of the wheeled, robotic vehicle 101. In some other embodiments, both the rotation of steering wheels and the orientation of steering wheels about an axis normal to the ground surface are actively controlled. In these embodiments, steering wheels function to control both the direction of the motion trajectory and the velocity along the motion trajectory of the wheeled, robotic vehicle 101.

Figure 3:
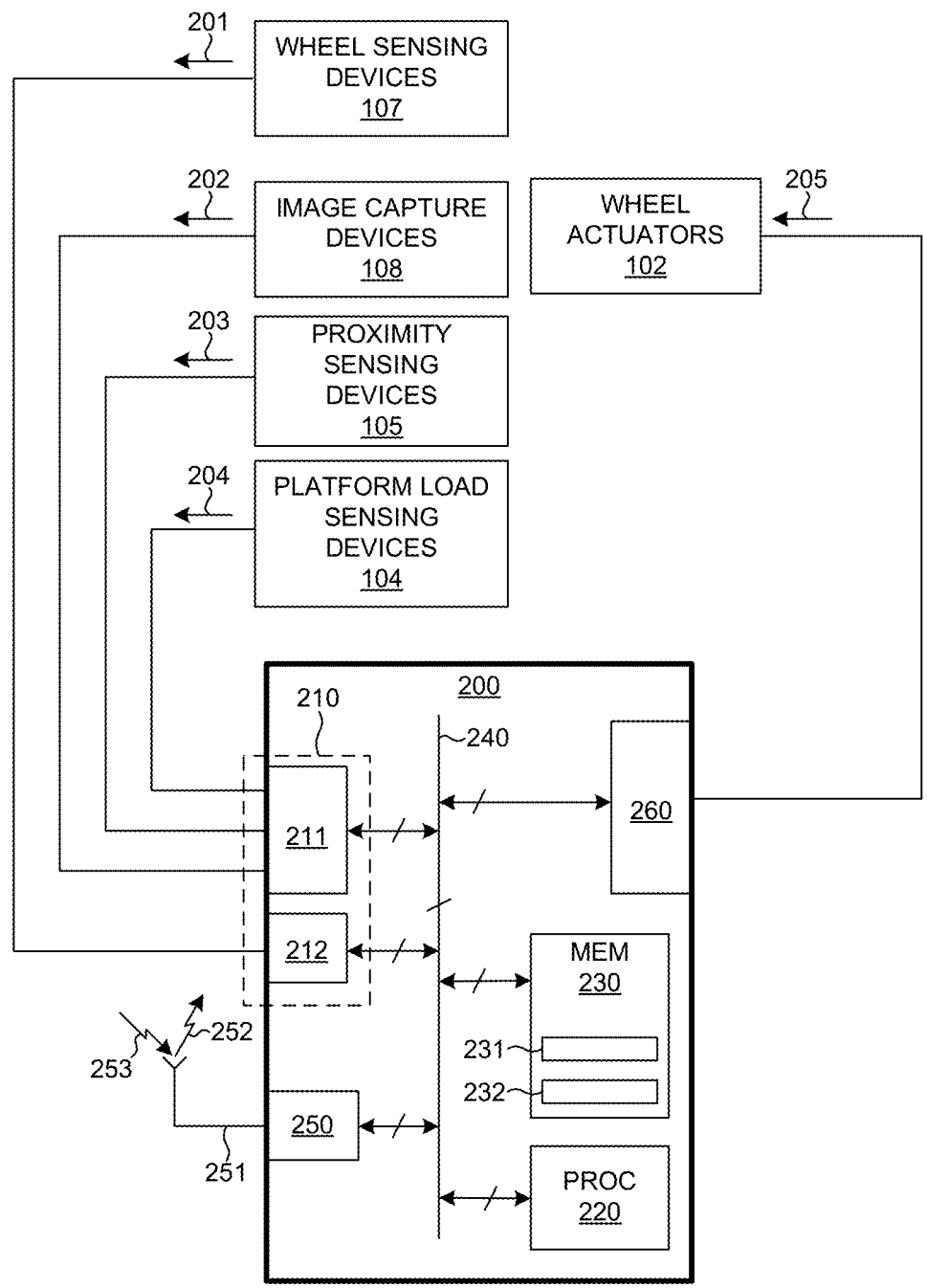
FIG. 3 is a schematic diagram illustrative of some elements of a collaborative robotic system 100.

FIG. 3 is a diagram illustrative of elements of collaborative robotic system 100 including computing system 200, platform load sensing devices 104, wheel sensing devices 107 (e.g., encoders, wheel speed sensors, etc., located at each actuated wheel), proximity sensing devices 105, image capture devices 108, and wheel actuators 102. In the embodiment depicted in FIG. 3, computing system 200 is communicatively coupled to platform load sensing devices 104, wheel sensing devices 107 (e.g., encoders located at each actuated wheel), proximity sensing devices 105, image capture devices 108, and wheel actuators 102 by wired communications links. However, in general, computing system 200 may be communicatively coupled to any of the sensors and devices described herein by either a wired or wireless communication link.

In general, any number of sensors and devices attached to collaborative robotic system 100, including sensors and devices to interact audibly, visually, and physically with a human collaborator may also be communicatively coupled to computing system 200.

As depicted in FIG. 3, computing system 200 includes a sensor interface 210, at least one processor 220, a memory 230, a bus 240, a wireless communication transceiver 250, and a controlled device interface 260. Sensor interface 210, processor 220, memory 230, wireless communication transceiver 250, and controlled device interface 260 are configured to communicate over bus 240.

Sensor interface 210 includes analog to digital conversion (ADC) electronics 211. In addition, in some embodiments, sensor interface 210 includes a digital input/output interface 212. In some other embodiments, sensor interface 210 includes a wireless communications transceiver (not shown) configured to communicate with a sensor to receive measurement data from the sensor.

As depicted in FIG. 3, ADC 211 is configured to receive signals 202 from image capture devices 108. In another non-limiting example, ADC 211 is configured to receive signals 203 from proximity sensing devices 105. In another non-limiting example, ADC 211 is configured to receive signals 204 from platform load sensing devices 104. ADC 211 is further configured to convert the analog signals 202-204 into equivalent digital signals suitable for digital storage and further digital processing. ADC 211 is selected to ensure that the resulting digital signal is a suitably accurate representation of the incoming analog signals (i.e., quantization and temporal discretization errors are within acceptable error levels). In some other embodiments, image capture devices 108, proximity sensing devices 105, and platform load sensing devices 104 include signal capture and processing capability on-board. In these embodiments, image data, proximity data, and load data are communicated digitally to computing system 200.

As depicted in FIG. 3, digital I/O 212 is configured to receive digital signals 201 from wheel sensing device 107. In this example, wheel sensing devices 107 include on-board electronics to generate digital signals 201 indicative of a measured displacement, velocity, etc., of each actuated wheel of wheeled robot 101. In this manner, computing system 200 is configured to interface with both analog and digital sensors. In general, any of the sensors described herein may be digital or analog sensors, and may be communicatively coupled to computing system 200 by the appropriate interface.

Controlled device interface 260 includes appropriate digital to analog conversion (DAC) electronics. In addition, in some embodiments, controlled device interface 260 includes a digital input/output interface. In some other embodiments, controlled device interface 260 includes a wireless communications transceiver configured to communicate with a device, including the transmission of control signals.

As depicted in FIG. 3, controlled device interface 260 is configured to transmit control commands 205 to one or more wheel actuators 102 that cause the collaborative robotic system 100 to move, for example, along a desired motion trajectory. In another non-limiting example, controlled device interface 260 is configured to transmit command signals (not shown) to an audio output device, such as a speaker, that causes the speaker to audibly communicate with a human collaborator. In yet another non-limiting example, controlled device interface 260 is configured to transmit display signals (not shown) to an image display device that causes the image display device to visually communicate with the human collaborator. In general, any combination of audio/visual input and output devices may be contemplated to implement a natural language communication interface between collaborative robotic system 100 and a human collaborator to facilitate collaborative task execution as described herein.

Memory 230 includes an amount of memory 231 that stores sensor data employed by collaborative robotic system 100 to navigate an environment while collaboratively executing a task with a human collaborator. Memory 230 also includes an amount of memory 232 that stores program code that, when executed by processor 220, causes processor 220 to implement collaborative task execution functionality as described herein.

In some examples, processor 220 is configured to store digital signals generated by sensor interface 210 onto memory 230. In addition, processor 220 is configured to read the digital signals stored on memory 230 and transmit the digital signals to wireless communication transceiver 250. In some embodiments, wireless communications transceiver 250 is configured to communicate the digital signals from computing system 200 to an external computing device (not shown) over a wireless communications link. As depicted in FIG. 3, wireless communications transceiver transmits a radio frequency signal 252 over antenna 251. The radio frequency signal 252 includes digital information indicative of the digital signals to be communicated from computing system 200 to the external computing device. In one example, sensor data generated by computer system 200 are communicated to an external computing system (not shown) for purposes of monitoring and redirecting the collaborative robotic system 100 based on the sensor data.

In some embodiments, wireless communications transceiver 250 is configured to receive digital signals from an external computing device (not shown) over a wireless communications link. The radio frequency signals 253 includes digital information indicative of the digital signals to be communicated from an external computing system (not shown) and computing system 200. In one example, control commands generated by an external computing system are communicated to computer system 200 for implementation by collaborative robotic system 100. In some embodiments, the control commands are provided to collaborative robotic system 100 based on an evaluation of the collaborative task that is jointly executed by collaborative robotic system 100 and a human collaborator. In some examples, an external computing system accesses additional sensor data (e.g., image data) that is otherwise unavailable to the collaborative robotic system 100. This additional sensor data is employed by the external computing system to update a motion trajectory of collaborative robotic system 100, for example, to avoid obstacles that are not within the field of view of collaborative robotic system 100.

In one example, collaborative robotic system 100 operates with a human collaborator to carry a large object (e.g., a desk) through a crowded environment (e.g., an office). FIGS. 4A-4D depict illustrations of collaborative robotic system 100 jointly moving a desk 130 with a human collaborator 120 through a crowded environment including object 125.

Figure 4A:
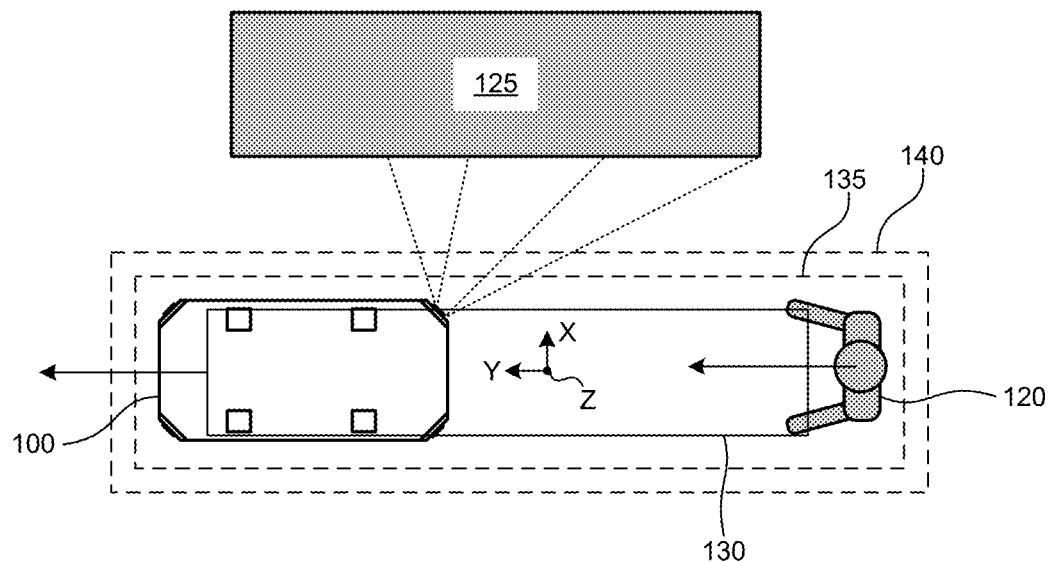
FIGS. 4A-4D depict illustrations of a collaborative robotic system jointly executing a task with a human collaborator involving moving an object through a crowded environment.

As depicted in FIG. 4A, robotic system 100 carries a portion of desk 130 on its payload platform and human collaborator 120 carries the remaining portion of desk 130. In the scenario depicted in FIG. 4A, robotic system 100 and human collaborator 120 move desk 125 in the Y-direction (i.e., from right to left across the drawing page). Human collaborator 120 provides general navigation instructions by applying forces to desk 130 in a plane parallel to the XY plane. Robotic system 100 measures a force applied to the payload in a plane parallel to the XY plane by human collaborator 120 based on force signals received from load sensors 104A-D. Computing system 200 determines a desired movement direction to be the direction of the measured force vector applied to the payload by the human collaborator in the plane parallel to the XY plane. For example, if the force applied to desk 130 in a plane parallel to the XY plane is aligned with the Y-direction, robotic system 100 determines the desired movement direction to be the Y-direction. However, if the force applied to desk 130 in a plane parallel to the XY plane is aligned with the X-direction, robotic system 100 determines the desired movement direction to be aligned with the X-direction.

Figure 4B:
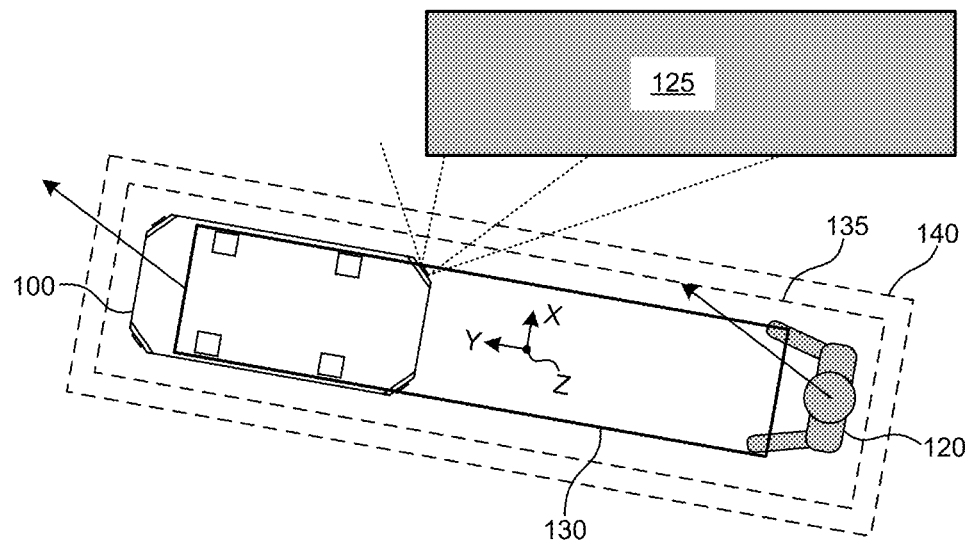

For example, as depicted in FIG. 4A, human collaborator 120 applies lateral forces to desk 130 in a direction aligned with the Y-direction. At this instant, robotic system 100 responds by moving in the Y-direction. However, as depicted in FIG. 4B, human collaborator 120 applies forces to desk 130 in a direction that includes both X and Y components. At this instant, robotic system 100 responds by moving in a direction aligned with the forces applied to desk 130 by human collaborator 120.

Figure 4C:
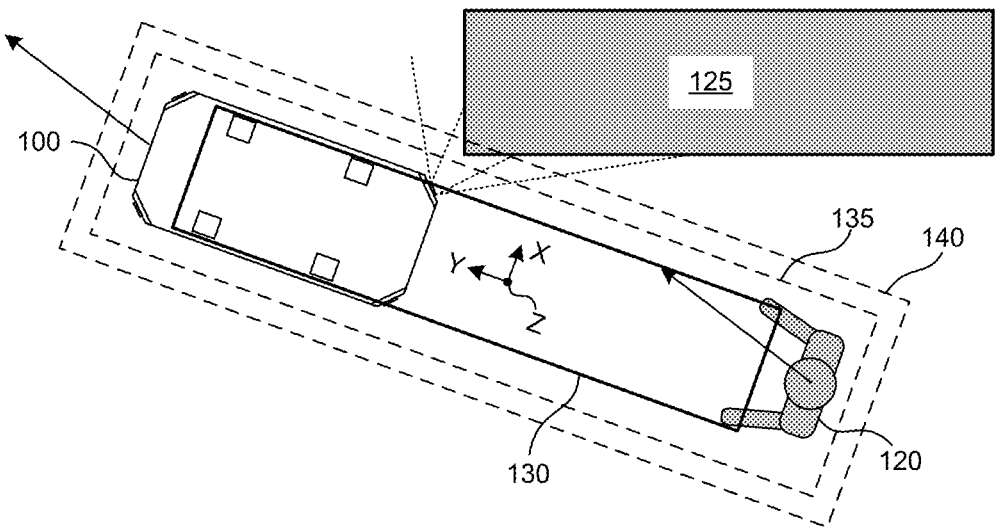

As depicted in FIGS. 4B and 4C, the forces applied to desk 130 (i.e., the navigational cues) by human collaborator 120 lead desk 130 on a collision course with object 125.

In another aspect, robotic system 100 overrides the navigational cues of the human collaborator to avoid collisions between an object in the environment and any of the robotic system itself, the human collaborator, the shared payload, or any combination thereof.

As depicted in FIGS. 4A-D, robotic system 100 monitors the position of objects in the surrounding environment relative to the robotic system 100, shared payload, and the human collaborator based on feedback from proximity sensors 105A-D, image capture devices 108, or a combination thereof. In the embodiment depicted in FIGS. 4A-D, robotic system 100 compares the measured position of object 125 relative to two virtual boundaries 135 and 140 maintained around robotic system 100, shared payload 130, and human collaborator 120. Virtual boundary 135 is considered a "hard" boundary, i.e., robotic system 100 should not navigate to any position that would allow an object in the surrounding environment to penetrate virtual boundary 135. Virtual boundary 140 is considered a "soft" boundary, i.e., robotic system 100 should navigate to a position that reduces the penetration of an object in the surrounding environment within virtual boundary 140. Virtual boundaries 135 and 140 are defined by predetermined threshold distance values from robotic system 100, shared payload 130, and human collaborator 120. Virtual boundary 140 is defined by a larger set of predetermined threshold distance values than virtual boundary 135.

When robotic system 100 determines that object 125 is outside of virtual boundary 140, robotic system 100 takes no obstacle avoidance measures. In these instances, robotic system 100 communicates command signals to actuated wheels 102A-D of wheeled, robotic vehicle 101 that cause the wheeled, robotic vehicle 101 to move along the movement direction desired by human collaborator 120 as determined by the forces applied to desk 130 by human collaborator 120 as measured by load sensors 104A-D. In these instances, the velocity vector of robotic system 100, $\vec{v}_r$, is equal to the desired velocity vector as indicated by human collaborator 120, $\vec{v}_{desired}$, as indicated by equation (1).

$$\vec{v}_r = \vec{v}_{desired} \quad (1)$$

However, when object 125 begins to impinge on virtual boundary 140, robotic system 100 behaves differently. Rather, than completely following the navigational cues provided by human collaborator 120, robotic system 100 modifies the desired trajectory to avoid collision with object 125. In some embodiments, a proportional control algorithm is employed as indicated by equation (2), $$\vec{v}_{mod} = -K_p(d_{buffer} - d_{OB})\hat{v}_x + \vec{v}_{desired} \quad (2)$$

where, $\vec{v}_{desired}$, is the desired velocity indicated by human collaborator 120, $d_{OB}$, is the closest distance between object 125 and virtual boundary 135, $d_{buffer}$, is the distance between virtual boundaries 135 and 140 at the location of deepest impingement of object 125 into virtual boundary 140, $\vec{v}_{mod}$, is the modified velocity vector implemented by robotic system 100 to control the trajectory of robotic system 100, $\hat{v}_x$, is the unit vector along the normal of the surface of object 125 which impinges on the buffer zone between virtual boundaries 135 and 140, and, $K_p$, is a constant value (i.e., the proportional gain associated with the control law indicated by equation (2)). In general, $K_p$ should be selected to result in an overdamped system response to maintain stability and avoid allowing robotic system 100 from navigating closer to object 125 than the minimum allowed distance to obstacles defined by virtual boundary 135. In some embodiments, the value of, $d_{buffer}$, i.e., the depth of the buffer zone defined by virtual boundaries 135 and 140, is scaled with the velocity of robotic system 100 in the direction of vector, $\hat{v}_x$. In this manner, if robotic system 100 is approaching object 125 at a relatively high rate of speed, the depth of the buffer zone is increased to provide time to navigate around object 125. Similarly, if robotic system 100 is approaching object 125 at a relatively low rate of speed, the depth of the buffer zone is decreased to allow human collaborator 120 to move desk 130 closer to object 125 without robotic system 100 overriding the navigational cues provided by human collaborator 120.

Figure 5:
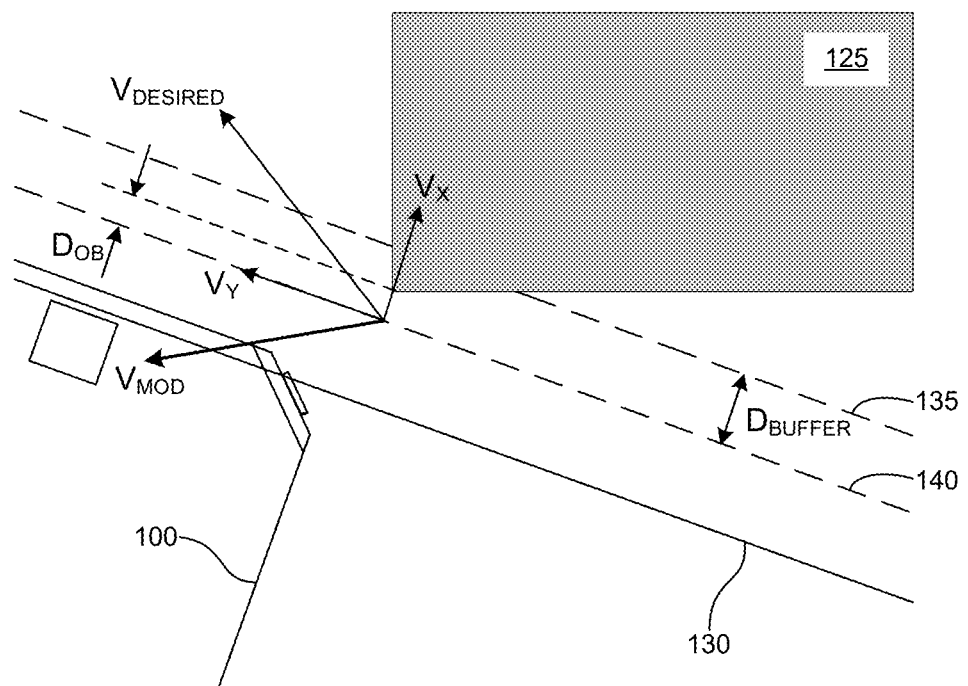
FIG. 5 depicts an illustration of the interaction between a collaborative robotic system and an object in the surrounding environment.

FIG. 5 illustrates the control law indicated by equation (2). At the instance depicted in FIG. 5, object 125 has impinged on virtual boundary 140. The magnitude of the impingement is the difference between the buffer distance, $D_{buffer}$, and the distance between object 125 and virtual boundary 135, $D_{OB}$. The desired velocity, $V_{desired}$, indicated by human collaborator 120 includes components in a direction, $V_x$, normal to the surface of object 125 where it impinges on the buffer zone between virtual boundaries 135 and 140, and a direction, $V_y$, tangent to the surface of object 125 where it impinges on the buffer zone between virtual boundaries 135 and 140. To avoid collision, the $V_y$ component of $V_{desired}$ is not a concern, but robotic system 100 determines a modified control velocity, $V_{mod}$, that counteracts the $V_x$ component of $V_{desired}$, for example, as indicated by the control law presented in equation (2).

Figure 4D:
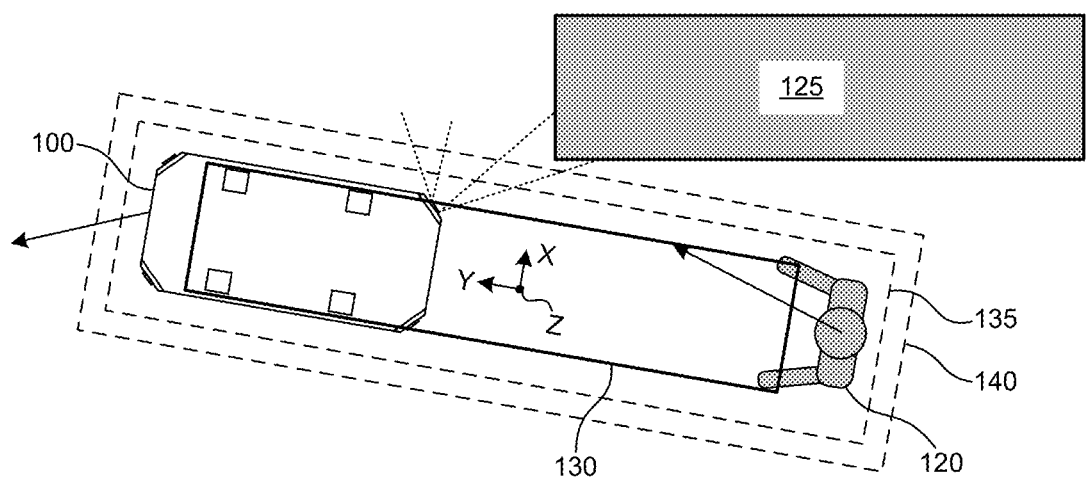

As depicted in FIGS. 4C and 4D, robotic system 100 implements a modified control velocity to navigate robotic system 100 and desk 130 away from object 125. In general, objects in the surrounding environment, e.g., object 125, may be stationary or moving relative to ground.

Figure 6:
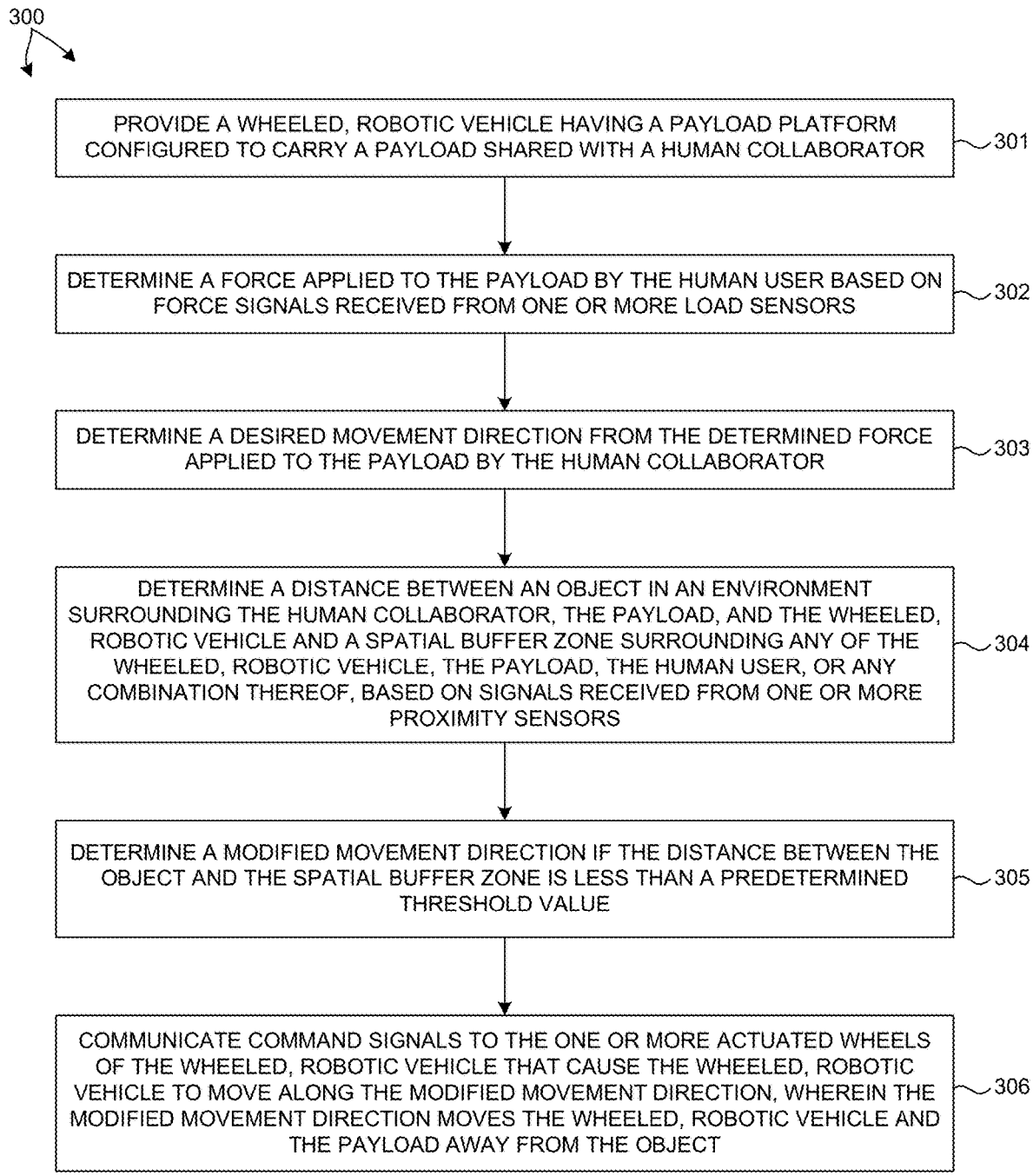
FIG. 6 illustrates a flowchart of a method 300 implementing collaborative task execution functionality by a collaborative robotic system and a human collaborator as described herein.

FIG. 6 illustrates a flowchart of a method 300 suitable for implementation by a collaborative robotic system as described herein. In some embodiments, collaborative robotic system 100 is operable in accordance with method 300 illustrated in FIG. 6. However, in general, the execution of method 300 is not limited to the embodiments of collaborative robotic system 100 described with reference to FIGS. 1-5. These illustrations and corresponding explanation are provided by way of example as many other embodiments and operational examples may be contemplated within the scope of this patent document.

In block 301, a wheeled, robotic vehicle is provided. The wheeled, robotic vehicle includes a payload platform configured to carry a payload shared with a human collaborator.

In block 302, a force applied to the payload by the human collaborator is determined based on force signals received from one or more load sensors.

In block 303, a desired movement direction is determined from the determined force applied to the payload by the human collaborator.

In block 304, a distance between an object in an environment surrounding the human collaborator, the payload, and the wheeled, robotic vehicle and a spatial buffer zone surrounding any of the wheeled, robotic vehicle, the payload, the human collaborator, or any combination thereof, is determined based on signals received from one or more proximity sensors.

In block 305, a modified movement direction is determined if the distance between the object and the spatial buffer zone is less than a predetermined threshold value.

In block 306, command signals are communicated to the one or more actuated wheels of the wheeled, robotic vehicle that cause the wheeled, robotic vehicle to move along the modified movement direction. The modified movement direction moves the wheeled, robotic vehicle and the payload away from the object.

The computing system 200 may include, but is not limited to, a personal computer system, mainframe computer system, workstation, image computer, parallel processor, or any other computing device known in the art. In general, the term "computing system" may be broadly defined to encompass any device, or combination of devices, having one or more processors, which execute instructions from a memory medium. In general, computing system 200 may be integrated with a robot, such as robotic system 100, or alternatively, may be separate, entirely, or in part, from any robot. In this sense, computing system 200 may be remotely located and receive data and transmit command signals to any element of robotic system 100.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A collaborative robotic system comprising:
a wheeled, robotic vehicle including:
one or more actuated wheels attached to a frame;
one or more load sensors mounted to the frame;
a payload platform configured to carry a payload shared with a human collaborator, the payload different from the human collaborator and the payload platform, the payload platform coupled to the one or more load sensors;
one or more proximity sensors coupled to the frame, the payload platform, or both; and
a computing system communicatively coupled to the wheeled, robotic vehicle, the computing system configured to:
determine a force applied to the payload by the human collaborator based on force signals received from the one or more load sensors;
determine a desired movement direction from the determined force applied to the payload by the human collaborator;
determine a distance between an object in an environment surrounding the human collaborator, the payload, and the wheeled, robotic vehicle and a spatial buffer zone surrounding any of the wheeled, robotic vehicle, the payload, the human collaborator, or any combination thereof, based on signals received from the one or more proximity sensors;
determine a modified movement direction if the distance between the object and the spatial buffer zone is less than a predetermined threshold value; and
communicate command signals to the one or more actuated wheels of the wheeled, robotic vehicle that cause the wheeled, robotic vehicle to move along the modified movement direction, wherein the modified movement direction moves the wheeled, robotic vehicle and the payload away from the object.

2. The collaborative robotic system of claim 1, wherein the one or more load sensors measure force in a direction parallel to a load carrying surface of the payload platform.

3. The collaborative robotic system of claim 1, wherein the one or more actuated wheels include a mecanum wheel, an omni-directional wheel, or any combination thereof.

4. The collaborative robotic system of claim 1, further comprising:
one or more payload platform actuators attached to the frame and the payload platform, the one or more payload platform actuators configured to move the payload platform in a direction normal to a load carrying surface of the payload platform.

5. The collaborative robotic system of claim 1, wherein the object in the environment is moving.

6. The collaborative robotic system of claim 1, further comprising:
one or more image capture devices, wherein the determining of the distance between the object in the environment and the spatial buffer zone is also based on image information received from the one or more image capture devices.

7. The collaborative robotic system of claim 1, wherein the computing system is further configured to:
communicate command signals to the one or more actuated wheels of the wheeled, robotic vehicle that cause the wheeled, robotic vehicle to move along the desired movement direction if the distance between the object and the spatial buffer zone is greater than the predetermined threshold value.

8. A method comprising:
providing a wheeled, robotic vehicle having a payload platform configured to carry a payload shared with a human collaborator, the payload different from the human collaborator and the payload platform;
determining a force applied to the payload by the human collaborator based on force signals received from one or more load sensors;
determining a desired movement direction from the determined force applied to the payload by the human collaborator;
determining a distance between an object in an environment surrounding the human collaborator, the payload, and the wheeled, robotic vehicle and a spatial buffer zone surrounding any of the wheeled, robotic vehicle, the payload, the human collaborator, or any combination thereof, based on signals received from one or more proximity sensors;
determining a modified movement direction if the distance between the object and the spatial buffer zone is less than a predetermined threshold value; and
communicating command signals to the one or more actuated wheels of the wheeled, robotic vehicle that cause the wheeled, robotic vehicle to move along the modified movement direction, wherein the modified movement direction moves the wheeled, robotic vehicle and the payload away from the object.

9. The method of claim 8, wherein the one or more load sensors measure force in a direction parallel to a load carrying surface of the payload platform.

10. The method of claim 8, wherein the object in the environment is moving.

11. The method of claim 8, wherein the determining of the distance between the object in the environment and the spatial buffer zone is also based on image information received from one or more image capture devices.

12. The method of claim 8, further comprising:
communicating command signals to the wheeled, robotic vehicle that cause the wheeled, robotic vehicle to move along the desired movement direction if the distance between the object and the spatial buffer zone is greater than the predetermined threshold value.

13. The method of claim 8, wherein the determining of the modified movement direction is based on a magnitude of impingement of the object into the spatial buffer zone.

14. A collaborative robotic system comprising:
a wheeled, robotic vehicle including:
one or more actuated wheels attached to a frame;
one or more load sensors mounted to the frame;
a payload platform configured to carry a payload shared with a human collaborator, the payload different from the human collaborator and the payload platform, the payload platform coupled to the one or more load sensors;
one or more proximity sensors coupled to the frame, the payload platform, or both; and
a non-transitory, computer-readable medium storing instructions that when executed by a computing system cause the computing system to:
determine a force applied to the payload by the human collaborator based on force signals received from the one or more load sensors;
determine a desired movement direction from the determined force applied to the payload by the human collaborator;
determine a distance between an object in an environment surrounding the human collaborator, the payload, and the wheeled, robotic vehicle and a spatial buffer zone surrounding any of the wheeled, robotic vehicle, the payload, the human collaborator, or any combination thereof, based on signals received from the one or more proximity sensors;
determine a modified movement direction if the distance between the object and the spatial buffer zone is less than a predetermined threshold value; and
communicate command signals to the one or more actuated wheels of the wheeled, robotic vehicle that cause the wheeled, robotic vehicle to move along the modified movement direction, wherein the modified movement direction moves the wheeled, robotic vehicle and the payload away from the object.

15. The collaborative robotic system of claim 14, wherein the one or more load sensors measure force in a direction parallel to a load carrying surface of the payload platform.

16. The collaborative robotic system of claim 14, wherein the one or more actuated wheels include a mecanum wheel, an omni-directional wheel, or any combination thereof.

17. The collaborative robotic system of claim 14, further comprising:
one or more payload platform actuators attached to the frame and the payload platform, the one or more payload platform actuators configured to move the payload platform in a direction normal to a load carrying surface of the payload platform.

18. The collaborative robotic system of claim 14, wherein the object in the environment is moving.

19. The collaborative robotic system of claim 14, further comprising:
one or more image capture devices, wherein the determining of the distance between the object in the environment and the spatial buffer zone is also based on image information received from the one or more image capture devices.

20. The collaborative robotic system of claim 14, the non-transitory, computer-readable medium further storing instructions that when executed by a computing system cause the computing system to:
communicate command signals to the one or more actuated wheels of the wheeled, robotic vehicle that cause the wheeled, robotic vehicle to move along the desired movement direction if the distance between the object and the spatial buffer zone is greater than the predetermined threshold value.

* * * * *